United States Patent
Park et al.

(10) Patent No.: US 9,632,567 B2
(45) Date of Patent: Apr. 25, 2017

(54) SYSTEM ON CHIP METHOD THEREOF, AND DEVICE INCLUDING THE SAME

(71) Applicant: SAMSUNG ELECTRONICS CO., LTD., Suwon-si, Gyeonggi-do (KR)

(72) Inventors: Jong Lae Park, Anyang-si (KR); Woo Jin Lee, Suwon-si (KR); Sang Il Park, Seoul (KR); Gyeong Teak Lee, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 138 days.

(21) Appl. No.: 14/630,015

(22) Filed: Feb. 24, 2015

(65) Prior Publication Data

US 2015/0277534 A1    Oct. 1, 2015

(30) Foreign Application Priority Data

Mar. 28, 2014  (KR) ........................ 10-2014-0037257

(51) Int. Cl.
*G06F 1/32*    (2006.01)

(52) U.S. Cl.
CPC ............ *G06F 1/329* (2013.01); *G06F 1/3296* (2013.01)

(58) Field of Classification Search
CPC ............ G06F 1/329; G06F 1/32; G06F 1/3296
See application file for complete search history.

(56) References Cited

U.S. PATENT DOCUMENTS

| | | |
|---|---|---|
| 5,825,674 A | 10/1998 | Jackson |
| 7,305,521 B2 | 12/2007 | Park |
| 7,412,613 B2 | 8/2008 | Park |
| 8,319,544 B2 | 11/2012 | Hur |
| 8,370,665 B2 | 2/2013 | Gargash |
| 8,560,869 B2 | 10/2013 | Allarey |
| 8,595,527 B2 | 11/2013 | Chung et al. |
| 2004/0268165 A1* | 12/2004 | May ................... G06F 1/3203 713/320 |
| 2008/0307240 A1* | 12/2008 | Dahan ................. G06F 1/06 713/320 |
| 2013/0074085 A1 | 3/2013 | Thomson et al. |
| 2013/0138985 A1 | 5/2013 | Wang et al. |
| 2013/0179711 A1 | 7/2013 | Aelion et al. |
| 2014/0157007 A1* | 6/2014 | Krishnappa .......... G06F 1/3296 713/300 |
| 2015/0106649 A1* | 4/2015 | Kannan ................ G06F 1/08 713/501 |
| 2015/0134982 A1* | 5/2015 | Park ..................... G06F 1/324 713/300 |

* cited by examiner

*Primary Examiner* — Vincent Tran

(74) *Attorney, Agent, or Firm* — F. Chau & Associates, LLC

(57) ABSTRACT

A Dynamic Voltage and Frequency Scaling (DVFS) method, comprising of a scheduling execution of DVFS to adjust frequency or voltage of a target device at a first scheduled time; monitoring operating frequency of the target device; and selectively deferring execution of DVFS at a later scheduled time based on the operating frequency of the target device; wherein execution of DVFS at a next scheduled time is deferred when the operating frequency of the target device is below a given minimum frequency.

20 Claims, 5 Drawing Sheets

SYSTEM ON CHIP METHOD THEREOF, AND DEVICE INCLUDING THE SAME

CROSS-REFERENCE TO RELATED APPLICATIONS

This application claims priority under 35 U.S.C. §119(a) from Korean Patent Application No. 10-2014-0037257 filed on Mar. 28, 2014, the disclosure of which is hereby incorporated by reference in its entirety.

TECHNICAL FIELD

Embodiments of the present inventive concept relate to Dynamic Voltage and Frequency Scaling (DVFS), and more particularly to a system on chip (SoC) having stored programs executable to prevent unnecessary DYES from being executed in a low power mode, an operation method thereof, and a device including the same.

DISCUSSION OF RELATED ART

DVFS is a technology which dynamically adjusts an operating frequency and an operating voltage DVFS may be employed in an electronic system to reduce power consumption.

A commonly used DVFS periodically checks the usage of an adjustment target circuit, adjusts the operating frequency and the operating voltage supplied to the adjustment target circuit to reduce power consumption in the adjustment target circuit.

An electronic system executing DVFS may reduce current consumption to some extent, but when the electronic system is in an idle state, DVFS may continue to execute and consume power.

Some SoCs employ both power down modes and DVFS to reduce power consumption. When a CPU in the SoC is awakened to execute DVFS during low power mode, power consumption surges disproportionally.

SUMMARY

A DVFS method, comprising of executing DVFS to adjust frequency or voltage of a target device at a first scheduled time; monitoring operating frequency of the target device; and selectively deferring execution of DVFS at a later scheduled time based on the operating frequency of the target device; wherein execution of DVFS at the next scheduled time is deferred when the operating frequency of the target device is below a reference frequency; wherein a CPU is selectively forced from idle to run state to execute DVFS based on the operating frequency of the target device; wherein an idled CPU is not forced to run state to execute DVFS at the next scheduled time when the operating frequency of the target device is below a reference frequency; and wherein the target device is a memory interface.

A system on chip (SOC), comprising of a CPU, a memory, and a target device controlled by the CPU, the memory having stored instructions executable by the CPU to execute DVFS to adjust frequency or voltage of the target device at a first scheduled time; monitor operating frequency of the target device; and defer execution of DVFS at the next scheduled time when the operating frequency of the target device is below a reference frequency; wherein the CPU is selectively forced from idle to run state to execute DVFS based on the operating frequency of the target device; wherein the CPU is not forced from idle state to run state to execute DVFS at the next scheduled time when the operating frequency of the target device is below a reference frequency; wherein the target device is a memory interface; wherein the target device is a non-CP IP; further including a second target device controlled by the CPU, wherein the memory includes further stored instructions executable by the CPU to perform DVFS to adjust frequency or voltage of the second target device; wherein the second target device is an I/O interface.

A wearable electronic device, comprising of a system on chip (SOC), comprising of a CPU, a memory, and a memory interface controlled by the CPU, the memory having stored instructions executable by the CPU to execute DVFS to adjust frequency or voltage of the target device at a first scheduled time; monitor operating frequency of the target device; and selectively defer execution of DVFS at a later scheduled time based on the operating frequency of the target device; a memory device connected to the memory interface; and a display.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE EMBODIMENTS

Figure 1:
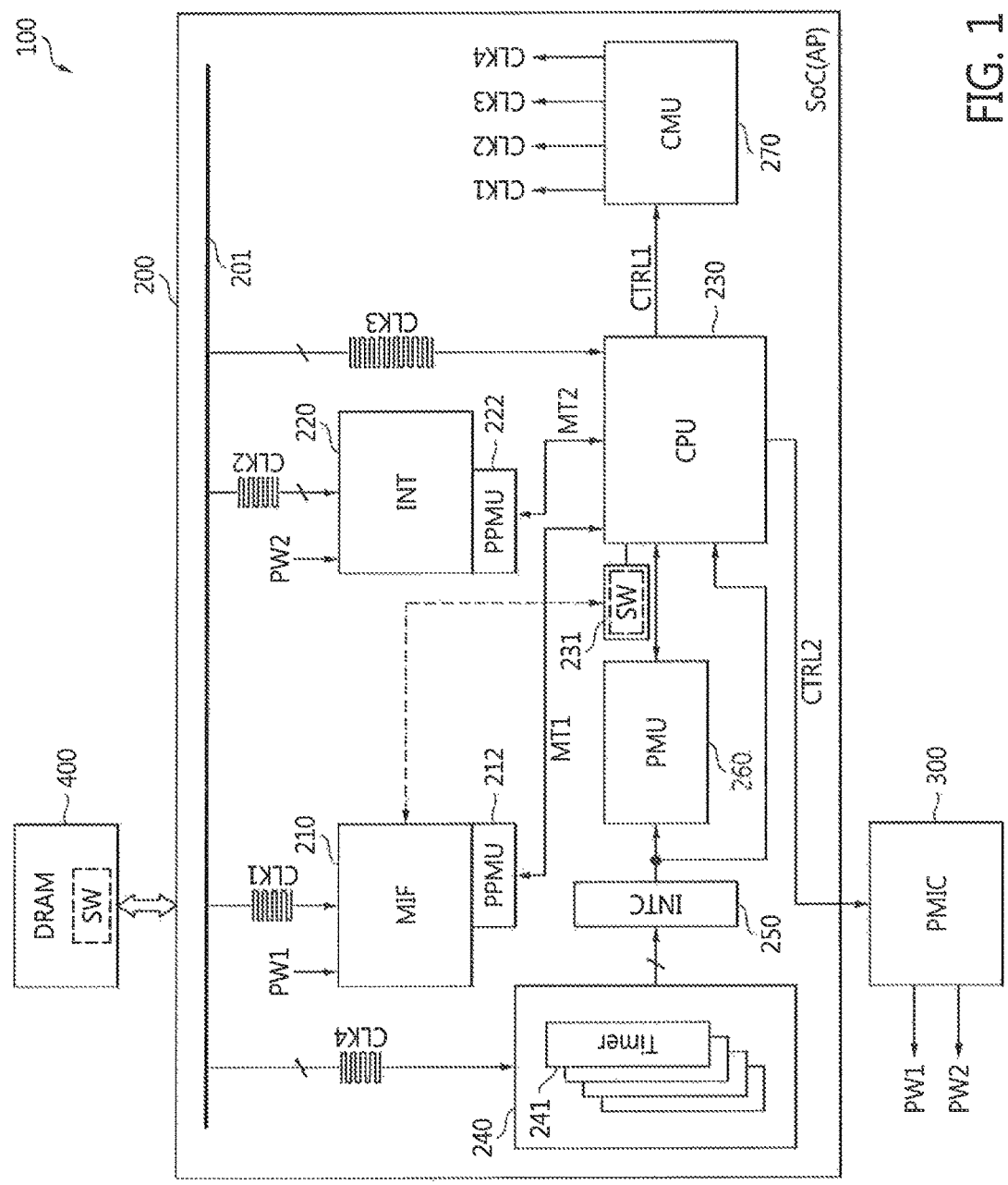
FIG. 1 is a block diagram of a system according to an example embodiment of the present inventive concepts.

The present inventive concepts now will be described more fully hereinafter with reference to the accompanying drawings, in which embodiments of the invention are shown. This invention may, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" When used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

In the following description of embodiments of the present inventive concept, when a frequency of DVFS target hardware is not a minimum frequency at a scheduled time (or time point), and a CPU is in a run state at a scheduled time, voluntary DVFS (or voluntary DVFS invocation), or voluntary invoking DVFS (VID) means executing DVFS for the DVFS target hardware at the scheduled time.

In executing DVFS, information on the scheduled time is set by a timer controlled by the CPU, such that an interrupt controller at the scheduled time generates an interrupt in response to an output signal of the timer. Accordingly, a CPU which is awakened by the interrupt may control execution of the DVFS at the scheduled time.

When a frequency of DVFS target hardware is not a minimum frequency at a scheduled time and a CPU is in an idle state at the scheduled time, the CPU is forced to awake in response to the interrupt at the scheduled time. Thus, voluntary DVFS or VID means executing on the target hardware DVFS at the scheduled time.

When a frequency of the DVFS target hardware is at a minimum frequency at a scheduled time, and the CPU is in an idle state at the scheduled time, involuntary DVFS (or involuntary DVFS invocation), or involuntary invoking DVFS (IID) means not executing the DVFS for the DVFS target hardware at the scheduled time.

When scheduled time is not set by the timer by the CPU, an interrupt controller connected to the timer does not generate an interrupt at the scheduled time. In this case, the CPU is not forced to awake to execute DVFS at the scheduled time.

Accordingly, a CPU awaken by a first interrupt generated at a first time after the scheduled time may control execution of DVFS. However, a CPU awaken by a first interrupt generated at a second time before the scheduled time may defer execution of the DVFS until the scheduled time. The first interrupt means an interrupt except other than an interrupt for a voluntary DVFS.

An exemplary embodiment of the present inventive concept is directed to DVFS, which may be executed upon a first hardware dynamically adjusting a frequency, a second hardware dynamically adjusting an operating voltage, or a third hardware controlling the first hardware and the second hardware, and a control module controlling a DVFS process.

The DVFS process may include voluntary DVFS or VID and involuntary DVFS or IID, and the control module may be executed by a CPU.

The first hardware may be embodied in a clock management unit, the second hardware may be embodied in a power management integrated circuit, the third hardware may be embodied in a CPU, and the control module may be embodied in DVFS software. However, the control module may be also embodied in hardware.

FIG. 1 is a block diagram of a system according to an exemplary embodiment of the present inventive concept. Referring to FIG. 1, a system 100 may include a system on chip (SoC) 200, a power management IC (PMIC) 300, and an external memory 400.

The system 100 may be embodied in a portable electronic device. The portable electronic device may be embodied in a smart phone, a tablet PC, a personal digital assistant (PDA), an enterprise digital assistant (EDA), a digital still camera, a digital video camera, a portable multimedia player (PMP), a personal navigation device or portable navigation device (PND), a mobile internet device (MID), a wearable smart device, an internet of things (IoT) device, or an internet of everything (IoE) device.

The SoC 200 may be embodied in an application processor (AP) or a mobile AP.

The SoC 200 may include a memory interface 210, a first performance monitoring unit (PPMU) 212, an internal logic 220 including a bus, a second PPMU 222, a CPU 230, an internal memory 231, a hardware module 240, an interrupt controller 250, a power management unit (PMU) 260, and a clock management unit (CMU) 270.

The memory interface 210 facilitates data transfer between the SoC 200 and the external memory 400. According to an embodiment of the present inventive concept, the memory interface 210 is a DVFS target hardware wherein a first operating voltage PW1 may be dynamically adjusted, when the DVFS is executed on the memory interface 210.

The first PPMU 212 may monitor performance of the memory interface 210. For example, the first PPMU 212 may monitor a frequency of the first clock CLK1 supplied to the memory interface 210, data traffic ratio of the memory interface 210, and/or usage of the memory interface 210.

Here, data traffic ratio may mean a ratio between an actual frequency at which data is being transmitted and a reference frequency of, e.g., the actual frequency of CLK1 is 60 MHz and the reference frequency of CLK1 delivered from the clock generator is 100 MHz. In such case, the data traffic ratio is 60%. The data traffic may also be called "a clock count".

The usage of the memory interface 210 means a ratio of a period of time in which the memory interface 210 is used to a fixed period of time.

According to an exemplary embodiment of the present inventive concept, stored software SW 231 includes stored codes for execution by CPU 230 to effect CVFS control. The CPU 230, executing SW 231, may read a first monitor signal MT1 corresponding to a result of the monitoring. Here, the first PPMU 212 may operate as a slave device of the CPU. For example, a first monitor signal MT1 may include a frequency, e.g., a reference frequency, of the first clock CLK1 and data traffic. The CPU 230 may determine a frequency at a current time and a next frequency at a next time, e.g., a scheduled time, using the frequency of the first clock CLK1 and the data traffic ratio read from the first monitor signal MT1. The reference frequency may mean a frequency of the first clock CLK1 supplied from the CMU 270 to the memory interface 210.

The internal logic 220 may mean an internal logic circuit including a bus. The internal logic 220 may also be a DVFS target hardware. For example, the internal logic 220 may operate using a second clock CLK2 and a second operating voltage PW2. When DVFS is executed on the internal logic 220, a frequency of the second clock CLK2 and a level of the second operating voltage PW2 may be dynamically adjusted.

The second PPMU 222 may monitor performance of the internal logic 220. For example, the second PPMU 222 may monitor a frequency of the second clock CLK2 supplied to the internal logic 220, data traffic ratio of the internal logic 220, and/or usage of the internal logic 220.

The CPU 230 may read a second monitor signal MT2 corresponding to the monitored data. Here, the second PPMU 222 may operate as a slave of the CPU 230. For example, the second monitor signal MT2 may include the frequency of the second clock CLK2, the reference frequency, and the data traffic ratio. Based on the monitored data, the CPU 230 may determine a frequency at a current time and a next frequency at a next time, e.g., a scheduled time, using the frequency of the second clock CLK2 and the data traffic ratio included in the second monitor signal MT2.

The reference frequency may mean the frequency of the second clock CLK2 supplied from the CMU 270 to the internal logic 220.

DVFS may be executed by executing upon DVFS software stored in SW 231. Upon reading the first monitor signal MT1 and the second monitor signal MT2, the CPU 230 in a run state may generate a first control signal CTRL1 and a second control signal CTRL2, and transmit the first control signal CTRL1 to the CMU 270, and transmit the second control signal CTRL2 to the PMIC 300.

When executing DVFS, the CMU 270 may increase or decrease the frequency of a clock, e.g., CLK1 and/or CLK2, in response to the first control signal CTRL1. The PMIC 300 may increase or decrease a level of a corresponding operating voltage, e.g., PW1 and/or PW2, for DVFS in response to the second control signal CTRL2.

The CPU 230 may operate using a third clock CLK3 output from the CMU 270.

To execute voluntary DVFS or VID, the CPU 230 may calculate a schedule time for the voluntary DVFS or the VID and set a calculated schedule time in the timer 241. To execute involuntary DVFS or IID, the CPU 230 calculates a schedule time for the involuntary DVFS or the IID and does not set the calculated schedule time in the timer 241. The schedule time information may be stored in SW 231.

According to an embodiment of the present inventive concept, the internal memory SW 231 may be embodied as a cache memory.

For example, the DVFS software stored in SW 231 executed by the CPU 230 may determine whether or not the frequency of the first clock CLK1 calculated based on the first monitor signal MT1 is a minimum frequency, whether or not the frequency of the second clock CLK2 calculated based on the second monitor signal MT2 is a minimum frequency, and/or whether a state of the CPU 230 is an idle state or a run state.

The minimum frequency described in the present specification may mean one of a minimum frequency (hereinafter, referred to as a first minimum frequency) among frequencies provided from the SoC 200 and a minimum frequency (hereinafter, referred to as a second minimum frequency) determined by software, e.g., the DVFS software SW. For example, the minimum frequency may mean a higher of the first minimum frequency and the second minimum frequency; however, this is not limited thereto.

The hardware module 240 may include a plurality of timers 241. The hardware module 240 may operate using a fourth clock CLK4 output from the CMU 270. For example, each of the plurality of timers 241 may be embodied in hardware or software. Each of the plurality of timers 241 may be used to schedule an operating system OS and/or to generate an interrupt related output signal at a scheduled time.

The interrupt controller 250 may generate an interrupt based on an output signal output from each timer 241 at each scheduled time.

The PMU 260 may control a power supply to supply power to components including the CPU 230 and interrupt controller 250. For example, the PMU 260 may control the power supply which may change the state of the CPU 230 from an idle state to a run state or from the run state to the idle state according to a control of the interrupt controller 250. For example, the idle state may include a low power mode.

The CPU 230 in an idle state may be awakened based on an interrupt output from the interrupt controller 250.

When DVFS is executed, the CMU 270 may increase or decrease a frequency of any or all of clocks CLK1, CLK2, CLK3, and CLK4 to be supplied to each element 210, 220, 230, and 240 in response to a first control signal CTRL1 output from the CPU 230. For example, when DVFS is executed, the CMU 270 may increase or decrease a frequency of the first clock CLK1 supplied to the memory interface 210 and/or or a frequency of the second clock CLK2 supplied to the internal logic 220.

Further, when the DVFS is executed, the PMIC 300 may increase or decrease an operating voltage to be supplied to each element 210, 220, 230, and 240 in response to the second control signal CTRL2 output from the CPU 230. For example, the PMIC 300 may increase or decrease a first operating voltage PW1 supplied to the memory interface 210 and/or a second operating voltage PW2 supplied to the internal logic 220.

DVFS to be described in the present specification may be executed on non-CPU intellectual property (IP). The non-CPU IP means an IP not having a CPU such as CPU 230, and the IP may be a hardware module having custom design features.

For convenience of description in the present specification, the memory interface 210 and the internal logic 220 with bus are illustrated as DVFS target hardware, e.g., non-CPU IP; however, the DVFS target hardware, i.e., the non-CPU IP, may mean a graphics processing unit (GPU), an image signal processor (ISP), or a display processor.

The external memory 400 may transmit or receive data through the bus 201 and the memory interface 210. The external memory 400 may store DVFS software SW.

The memory interface 210 may transmit the DVFS software SW output from the external memory 400 to the internal memory 231, and transmit the DVFS software SW output from the internal memory 231 to the external memory 400.

The external memory 400 may be embodied in a volatile memory or a non-volatile memory. For example, the volatile memory may be embodied in a dynamic random access memory (DRAM) or a static RAM (SRAM). The non-volatile memory may be embodied in a flash-based memory, a phase change RAM (PRAM), or a magnetic RAM (MRAM).

Figure 2:
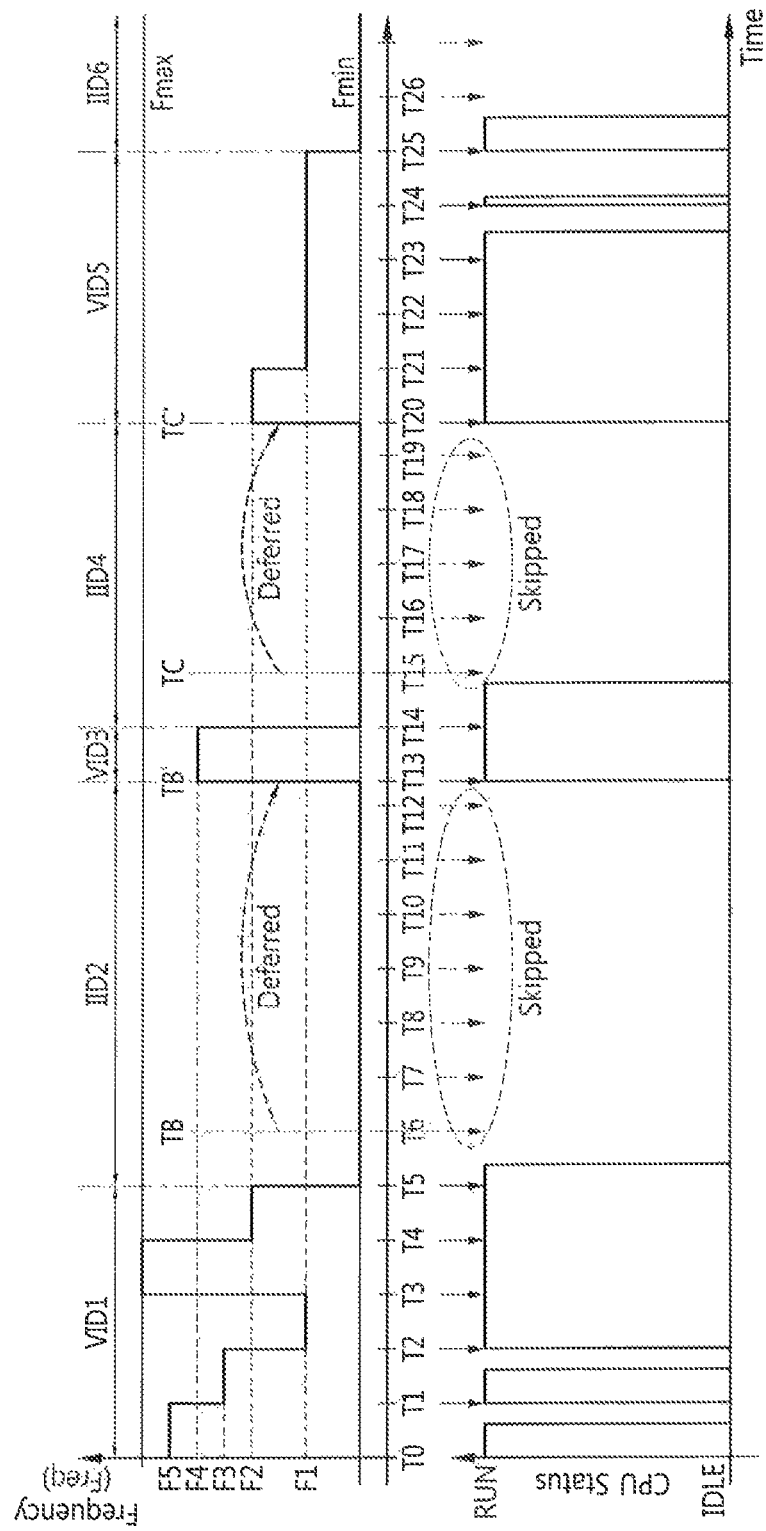
FIG. 2 is a timing diagram of DVFS which is executed in the system illustrated in FIG. 1.
Figure 3:
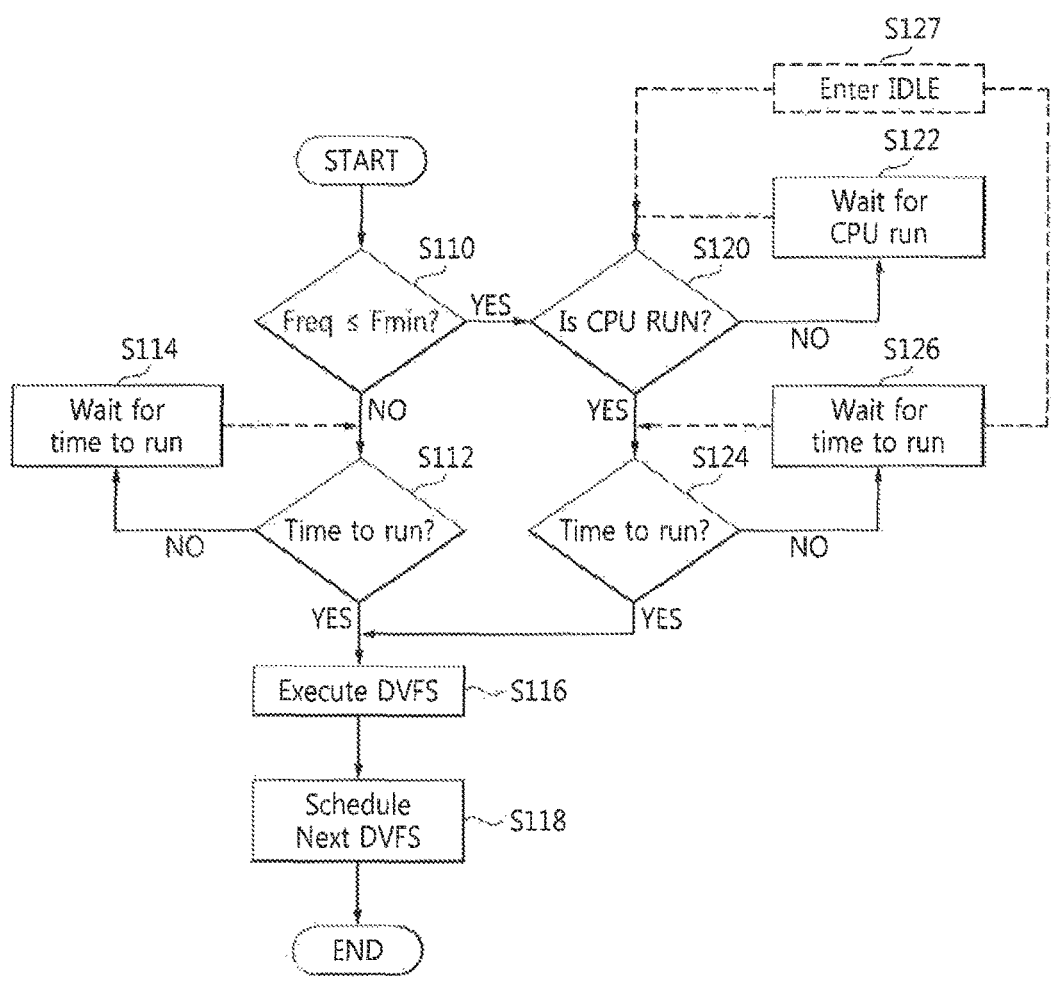
FIG. 3 is a flowchart for describing an operation of the system illustrated in FIG. 1.

FIG. 2 is a timing diagram of DVFS executed in the system illustrated in FIG. 1, and FIG. 3 is a flowchart for describing an operation of the system illustrated in FIG. 1. Referring to FIGS. 1 to 3, the DVFS according to an exemplary embodiment of the present inventive concepts may be applied for the above-mentioned non-CPU IP. For purposes of illustration, the DVFS target hardware is the memory interface 210.

According to an embodiment of the present inventive concept, voluntary DVFS or VID is executed at each scheduled time T1 to T5 of a first section VID1. At an initial time T0, when the CPU 230 is in a run state RUN, the first clock CLK1 having an initial frequency F5 is supplied to the memory interface 210, and the first operating voltage PW1 having a level corresponding to the initial frequency F5 is supplied to the memory interface 210. Accordingly, the memory interface 210 may operate using the first clock signal CLK1 and the first operating voltage PW1.

The CPU 230, executing DVFS code stored in SW 231, may schedule a cycle (or period), e.g., a next time T1, for the voluntary DVFS, and set a scheduled time T1 in the timer 241. The CPU 230 may program the scheduled time T1 and/or first information which indicates that the voluntary DVFS needs to be executed at the scheduled time T1. The first information may be set as an internal variable. The first information may also be stored in SW 231 and accessed by the CPU 230 before a state of the CPU 230 enters into an idle state IDLE from a run state RUN.

The interrupt controller 250 at the scheduled time T1 generates an interrupt in response to an output signal output from the timer 241. Here, the CPU 230 in an idle state IDLE is awakened in response to the interrupt and the awakened CPU 230 executes the DVFS code and reads the first monitor information MT1 from the first PPMU 212.

For example, referring to FIG. 2 and the flow diagram of FIG. 3, the CPU 230 at the schedule time T1 may execute the voluntary DVFS based on the first information. When the CPU 230 at the scheduled time T1 is in an idle state IDLE, the CPU 230 is awakened in response to an interrupt, and the awakened CPU 230 determines whether or not a current frequency F5 of the memory interface 210 is a minimum frequency Fmin based on the first monitor information MT1 (S110).

However, when the CPU 230 is in a run state RUN, the CPU 230 reads the first monitor information MT1 from the first PPMU 212 in response to an interrupt, and determines whether or not the current frequency F5 of the memory interface 210 is a minimum frequency Fmin based on the first monitor information MT1 (S110).

The awakened CPU 230 may determine whether a current time is the scheduled time T1 (S112). For example, the awakened CPU 230 determines whether or not the current time is time for the CPU 230 to run based on the first information (S112). As a result of the determination, when the current time is before the scheduled time T1, the CPU 230 waits until the scheduled time T1 (S114). That is, the voluntary DVFS is deferred until the schedule time T1.

As a result of the determination at the scheduled time T1, since a current frequency F5 of the memory interface 210 is not a minimum frequency Fmin, the CPU 230 running at the scheduled time T1, i.e., a run time, outputs a first control signal CTRL1 to the CMU 270, and outputs a second control signal CTRL2 to the PMIC 300 (S112). Accordingly, the CMU 270 decreases a frequency of the first clock CLK1 from F5 to F3, and the PMIC 300 decreases a level of the first operating voltage PW1 to a level corresponding to the F3. That is, voluntary DVFS for the memory interface 210 is executed (S116).

As a precondition of the voluntary DVFS (S116), the CPU 230 needs to be in a run state RUN. Accordingly, when the CPU 230 is in an idle state IDLE, the CPU 230 is awakened in response to an interrupt, and a state of the CPU 230 is changed to a run state RUN.

The CPU 230 schedules a next DVFS time T2 for the voluntary DVFS based on frequencies F5 and F3, and sets the next DVFS time T2 in the timer 241 (S118). For example, the CPU 230 may program the scheduled time T2 and/or first information which indicates that the voluntary DVFS needs to be executed at the schedule time T2 in the DVFS software SW. For example, F5 may mean a current frequency at a current time T1, and F3 may mean a next frequency at a next time or a scheduled time T2.

The interrupt controller 250 at the scheduled time T2 generates an interrupt in response to a signal output from the timer 241. The CPU 230 reads the DVFS software SW stored in the internal memory 231 in response to the interrupt, and reads the first monitor information MT1 from the first PPMU 212. For example, when the CPU 230 is in a idle state IDLE, the CPU 230 is awakened in response to an interrupt, and the awakened CPU 230 determines whether or not a current frequency F3 of the memory interface 210 is a minimum frequency Fmin based on the first monitor information MT1 (S110).

As a result of the determination at the scheduled time T2, since the current frequency F3 of the memory interface 210 is not a minimum frequency Fmin, the CPU 230 running at the scheduled time T2, i.e., a run time, outputs a first control signal CTRL1 to the CMU 270 and outputs a second control signal CTRL2 to the PMIC 300 (S112).

Accordingly, the CMU 270 decreases the frequency of the first clock CLK1 From F3 to F1, and the PMIC 300 decreases a level of the first operating voltage PW1 to a level corresponding to the F1. That is, the voluntary DVFS for the memory interface 210 is executed (S116).

The CPU 230 schedules a next DVFS time T3 for the voluntary DVFS based on frequencies F3 and F1, and sets a next DVFS time T3 in the timer 241 (S118). For example, the CPU 230 may program a schedule time T3 and/or first information which indicates that the voluntary DVFS needs to be executed at the scheduled time T3.

For example, F3 may mean a current frequency at a current time T2, and F1 may mean a next frequency at a next time or the scheduled time T3.

The interrupt controller 250 at the scheduled time T3 generates an interrupt in response to a signal output from the timer 241.

Since the CPU 230 is in a run state RUN at the scheduled time T3, the CPU 230 reads the first monitor information MT1 from the first PPMU 212 in response to the interrupt, and determines whether or not a current frequency F1 of the memory interface 210 is a minimum frequency Fmin based on the first monitor information MT1 (S110).

As a result of the determination at the scheduled time T3, since the current frequency F1 of the memory interface 210 is not the minimum frequency Fmin, the CPU 230 running at the scheduled time T3, i.e., a run time, outputs a first control signal CTRL1 to the CMU 270 and outputs a second control signal CTRL2 to the PMIC 300 (S112). Accordingly, the PMIC 300 increases a level of the first operating voltage PW1, and the CMU 270 increases a frequency of the first clock CLK1 from F1 to Fmax. That is, the voluntary DVFS for the memory interface 210 is executed (S116).

The CPU 230 schedules a next DVFS time T4 for the voluntary DVFS based on frequencies F1 and Fmax, and sets the next DVFS time T4 in the timer 241 (S118). For example, the CPU 230 may program the scheduled time T4 and/or first information which indicates that the voluntary DVFS needs to be executed at the scheduled time. For example, F1 may mean a current frequency at a current time T3, and Fmax may mean a next frequency at a next time or the schedule time T4.

The interrupt controller 250 at the scheduled time T4 generates an interrupt in response to a signal output from the timer 241.

Since the CPU 230 is in a run state RUN at the scheduled time T4, the CPU 230 reads the first monitor information MT1 from the first PPMU 212 in response to the interrupt, and determines whether or not a current frequency Fmax of the memory interface 210 is a minimum frequency Fmin based on the first monitor information MT1 (S110).

As a result of the determination at the scheduled time T4, since the current frequency Fmax of the memory interface 210 is not the minimum frequency Fmin, the CPU 230 running at the scheduled time T4, i.e., a run time, outputs a first control signal CTRL1 to the CMU 270 and outputs a second control signal CTRL2 to the PMIC 300 (S112). Accordingly, the CMU 270 decreases a frequency of the first clock CLK1 from Fmax to F2, and the PMIC 300 decreases the first operating voltage PW1. That is, the voluntary DVFS for the memory interface 210 is executed (S116).

The CPU 230 schedules a next DVFS time T5 for the voluntary DVFS based on frequencies Fmax and F2, and sets the next DVFS time T5 in the timer 241 (S118). For example, the CPU 230 may program the scheduled time T5 and/or first information which indicates that the voluntary DVFS needs to be executed at the scheduled time T5.

The interrupt controller 250 at the scheduled time T5 generates an interrupt in response to a signal output from the timer 241.

Since the CPU 230 is in a run state RUN at the scheduled time T5, the CPU 230 reads the first monitor information MT1 from the first PPMU 212 in response to the interrupt, and determines whether or not a current frequency F2 of the memory interface 210 is a minimum frequency based on the first monitor information MT1 (S110).

As a result of the determination, since the current frequency F2 of the memory interface 210 is not the minimum frequency Fmin, the CPU 230 running at the scheduled time T5, i.e., a run time, outputs a first control signal CTRL1 to the CMU 270, and outputs a second control signal CTRL2 to the PMIC 300 (S112). Accordingly, the CMU 270 decreases a frequency of the first clock CLK1 from F2 to Fmin, and the PMIC 300 decreases the first operating voltage PW1. That is, the voluntary DVFS for the memory interface 210 is executed (S116).

The CPU 230 schedules a next DVFS time T6=TB for involuntary DVFS based on frequencies F2 and Fmin, and does not set the next DVFS time T6 in the timer 241 (S118). For example, the CPU 230 may program the schedule time T6 and/or second information which indicates the involuntary DVFS needs to be executed at the scheduled time T6. For example, the second information may be set as an internal variable.

For example, before a state of the CPU 230 enters into an idle state IDLE from a run state RUN, the second information may be stored in the internal memory SW 231. For example, the CPU 230 may determine an execution time of DVFS and/or a DVFS method based on the first information.

As described above, when a current frequency at a current time T1 to T4 is not a minimum frequency, and a next frequency at a scheduled time T2 to T5 is not the minimum frequency Fmin, the system 100 may execute voluntary DVFS or VID at the current time T1 to T4, schedule that DVFS to be executed at the scheduled time T2 to T5 is the voluntary DVFS or the VID, and set the scheduled time T2 to T5 in the timer 241. For example, the scheduled time may be defined as 100 ms and an elapsed time from a current time. It is noted that one ordinary skilled in the art would appreciate that the voluntary DVFS process described above with the given timing, frequency, and voltage information and characteristics are exemplary to illustrate embodiments of the present inventive concept and therefore such process, information and characteristics are not limited thereof.

Execution of involuntary DVFS or IID is illustrated with reference to FIG. 2, from time T6 to T13, in a second section IID2.

The timer 241 does not output a DVFS-related output signal at each time T6 to T13 and the interrupt controller 250 at time T6 to T12 does not output an interrupt signal. Since the CPU 230 is in an idle state IDLE from T6 to T13, DVFS is not executed from T6 to T12.

However, when the interrupt controller 250 generates a first interrupt in addition to an interrupt for voluntary DVFS at a time T13=TB', e.g., an unscheduled time, the CPU 230 is awakened in response to the first interrupt and the awakened CPU 230 accesses the DVFS software in SW 231. The stored DVFS in SW 231 may include second information which indicates that involuntary DVFS needs to be executed at the scheduled time T6, the CPU 230 may determine a DVFS method to be executed at a current time T13, and whether the current time T13 is before or after the scheduled time T6 based on the second information.

The CPU 230 which is awakened by the first interrupt reads the first monitor information MT1 from the first PPMU 212, and determines whether or not a current frequency Fmin of the memory interface 210 is a minimum frequency Fmin based on the first monitor information MT1 (S110).

As a result of the determination, when the current frequency Fmin of the memory interface 210 is at the minimum frequency (S110), and the CPU 230 is in a run state RUN (S120), the CPU 230 determines whether or not an interrupt time T13 is after the schedule time T6 (S124). If the CPU 230 is in a run state RUN (S120), and the interrupt time T13 is after the scheduled time T6 (S124), the CPU 230 outputs a first control signal CTRL1 to the CMU 270 and outputs a second control signal CTRL2 to the PMIC 300 so as to control the involuntary DVFS.

Accordingly, the PMIC 300 increases the first operating voltage PW1, and the CMU 270 increases a frequency of the first clock CLK1 from Fmin to F4. That is, involuntary DVFS for the memory interface 210 is executed (S116).

When the CPU 230 is not in a run state RUN at a time T13 (S120), the involuntary DVFS is not executed until a state of the CPU 230 becomes a run state RUN (S122). As described above, a state of the CPU 230 may be changed to a run state by the first interrupt.

Moreover, when the CPU 230 is not in a run state RUN, execution of the involuntary DVFS is deferred until a state of the CPU 230 becomes a run state RUN. For example, CPU 230 is not in a run state RUN from T7 to T12 after the scheduled time T6, DVFS for the memory interface 210 is not executed from time T7 to T12. For example, Fmin may mean a current frequency at a current time T13, and F4 is a next frequency at a next time or a scheduled time T14. As described above, the current frequency and the next frequency may be determined based on the first monitor information MT1.

At each time T6 to T13, a current frequency of the memory interface 210 is a minimum frequency Fmin, and the CPU 230 is in an idle state IDLE. Accordingly, DVFS is skipped or not invoked from T6 to T12, and DVFS to be executed at a time T6 is deferred to a time T13. That is, an involuntary DVFS or IID is executed in a second section IID2. Voluntary DVFS is executed at a time T14 in a third section VID3.

After the involuntary DVFS is executed at the time T13, the CPU 230 schedules a next DVFS time T14 for the voluntary DVFS based on frequencies Fmin and F4, and sets the next DVFS time T14 in the timer 241 (S118). For example, the CPU 230 may program the scheduled time T14 and/or first information which indicates that the voluntary DVFS needs to be executed at the scheduled time T14 in the DVFS software SW.

The interrupt controller 250 generates an interrupt in response to a signal output from the timer 241 at the scheduled time T14.

When the CPU 230 is in a run state RUN at the scheduled time T14, the CPU 230 reads the first monitor information MT1 from the first PPMU 212 in response to the interrupt, and determines whether a current frequency F4 of the memory interface 210 is a minimum frequency Fmin based on the first monitor information MT1 (S110).

If it is determined that the current frequency F4 of the memory interface 210 is not the minimum frequency Fmin (S110), the CPU 230 running at the scheduled time T14 outputs a first control signal CTRL1 to the CMU 270, and outputs a second control signal CTRL2 to the PMIC 300 (S112).

Accordingly, the CMU 270 decreases a frequency of the first clock CLK1 from F4 to Fmin, and the PMIC 300 decreases a first operating voltage PW1. That is, at the scheduled time T14, the voluntary DVFS for the memory interface 210 is executed.

The CPU 230, executing DVFS software code stored in SW 231, may program the scheduled time T15 and/or second information which indicates that the involuntary DVFS needs to be executed at the scheduled time T15, depending upon the current frequency. However, if frequencies F4 is at the CPU 230 does not set the next DVFS time T15 in the timer 241 (S118). Since the timer 241 does not output an output signal at each time T15 to T20, the interrupt controller 250 at each time T15 to T19 does not generate an interrupt signal. Since the CPU 230 is in an idle state IDLE at each time T15 to T19, DVFS is not executed at each time T15 to T19.

A current frequency of the memory interface 210 at each time T15 to T20 in a fourth section IID4 is a minimum frequency Fmin, and the CPU 230 is in an idle state IDLE (S120). Accordingly, the DVFS is skipped at each time T15 to T19, and DVFS to be executed at a time T15 may be deferred to time T20=TC'. That is, involuntary DVFS or IID may be executed in the fourth section IID4.

When the interrupt controller 250 generates a first interrupt in addition to an interrupt for DVFS at time T20, the CPU 230 is awakened in response to the first interrupt, and the awakened CPU 230 reads the DVFS software at SW 231. Since the scheduled time T15 and/or second information which indicates that involuntary DVFS is to be executed at the scheduled time T15, the CPU 230 may determine a DVFS method at a current time T20 and whether or not the current time T20 is after the scheduled time T15.

That is, the CPU 230 which is awakened by the first interrupt is in a run state RUN (S120), and the current time T20 is after the scheduled time T15 (S124), the system 100 may execute involuntary DVFS or IID (S116).

Thus, similar to as described for time T1 to T5 in a first section VID1, voluntary DVFS or VID may be executed at each scheduled time T21 to T25 in a fifth section VID5. As described referring to each time T6 to T12 in the second section IID2, involuntary DVFS or IID is executed at a scheduled time T26 in a sixth section IID6.

Figure 4:
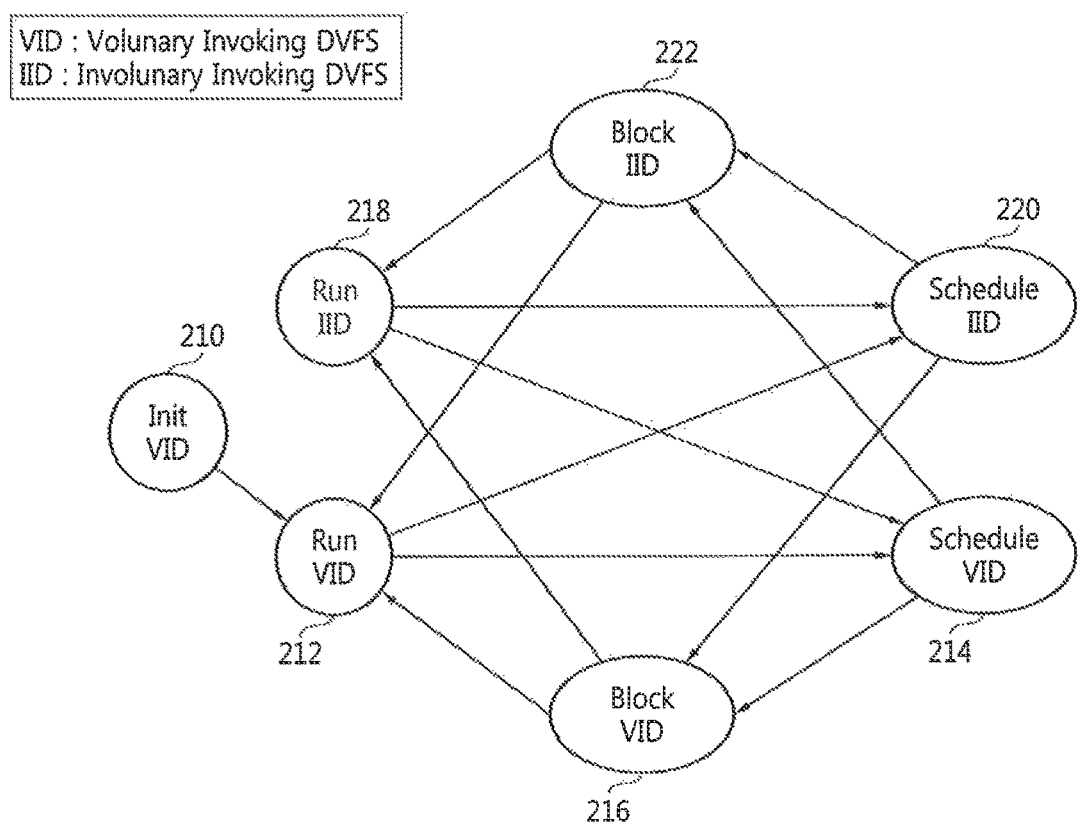
FIG. 4 is a state diagram of DVFS which is executed in the system illustrated in FIG. 1.
Figure 5:
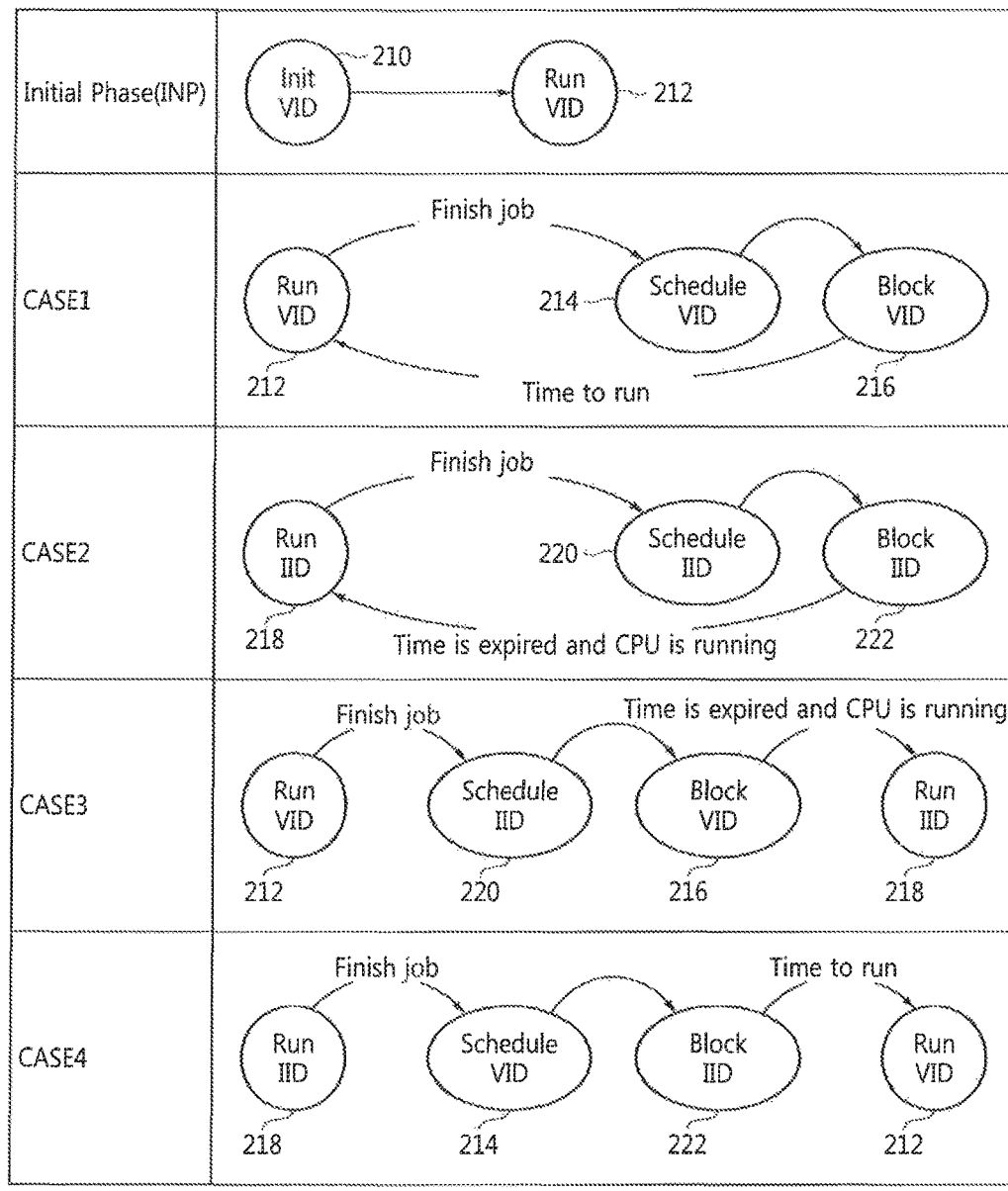
FIG. 5 is a conditional state diagram according to the state diagram of DVFS illustrated in FIG. 4.

FIG. 4 is a state diagram representation of an exemplary execution of DVFS process and FIG. 5 is a conditional state diagram of the states of FIG. 4.

Referring to FIGS. 4 and 5, voluntary DVFS starts an initial step (or phase) INP (210), e.g., at an initial time T0 (212).

When each of a current frequency at a current time and a next frequency at a next time (scheduled time) of the DVFS target hardware is not a minimum frequency Fmin, CASE 1 is executed.

For example, when a current frequency F5 at a current time T1 is not a minimum frequency Fmin, and a next frequency F3 at a scheduled time T2 is not the minimum frequency Fmin, VID is executed at the current time T1 (212), and when the VID is finished at the current time T1, the scheduled time T2 for the VID is scheduled (214). The VID is blocked and deferred until the scheduled time T2 (S216). When the current time reaches the schedule time T2, i.e., a run time, the VID is executed according to a control of the CPU 230, provided that CPU 230 is running (212).

As another example, when a current frequency F1 at a current time T3 is not a minimum frequency Fmin, and a next frequency Fmax at a scheduled time T4 is not the minimum frequency Fmin, VID is executed at the current time T3 (212), and when the VID at the current time T3 is finished, the scheduled time T4 for the VID is scheduled (S214). The VID is blocked and deferred until the scheduled time T4 (216). When the current time becomes the scheduled time T4, i.e., a run time, the VID is executed (212).

When each of a current frequency at a current time and a next frequency at a scheduled time of the DVFS target hardware is a minimum frequency Fmin, CASE 2 is executed.

For example, a current frequency Fmin at a current time T6 is the minimum frequency Fmin, and a next frequency Fmin at a scheduled time T7 is the minimum frequency Fmin, DVFS is not executed at the current time T6 (S218). After T6, IID is scheduled at a next time T7 (220). However, since the CPU 230 is in an idle state IDLE, the IID is blocked or deferred (222). However, when the CPU 230 is awakened by a first interrupt at a time T13, and a state of the CPU 230 is changed to a run state RUN, the IID may be executed at the time T13 (218).

When a current frequency at a current time T5 or T14 of the DVFS target hardware is not the minimum frequency Fmin, and a next frequency at a scheduled time T6 or T15 is the minimum frequency Fmin, CASE 3 is executed.

For example, when VID is executed at the current time T5 or T14 (212), IID is scheduled at the scheduled time T6 or T15 (220). Accordingly, VID is blocked or deferred at the scheduled time T6 or T15 (216). When time T13 or T20 is after the scheduled time T6 or T15, and the CPU 230 is in a run state RUN IID is executed at time T13 or T20 (218).

When a current frequency at a current time T13 or T20 of the DVFS target hardware is the minimum frequency Fmin, and a next frequency at a scheduled time T4 or T21 is not the minimum frequency Fmin, CASE 4 is executed.

For example, IID is executed at the current time T13 or T20 (218). When execution of the IID is completed, VID is scheduled at the scheduled time T14 or T21 (214). IID is blocked or deferred at the scheduled time T14 or T21 (222), and VID is executed at the scheduled time T14 or T21 (212).

As described above, a system on chip according to an exemplary embodiment of the present inventive concepts executes involuntary VDFS in a low power mode and executes voluntary DVFS in a normal operation mode, thereby preventing unnecessary power consumption.

According to at least one embodiment of the present inventive concept, a Dynamic Voltage and Frequency Scaling (DVFS) method is provided, comprising of scheduling execution of DVFS to adjust frequency or voltage of a target device at a first scheduled time; monitoring operating frequency of the target device; and selectively deferring execution of DVFS at a later scheduled time based on the operating frequency of the target device, wherein execution of DVFS at a next scheduled time is deferred when the operating frequency of the target device is below a given minimum frequency. According to an embodiment, a CPU is selectively forced from idle to run state to execute DVFS based on the operating frequency of the target device. According to another embodiment, an idled CPU is not forced to run state to execute DVFS at a next scheduled time when the operating frequency of the target device is below a given minimum frequency, wherein operating frequency or supplied voltage of the target device is reduced upon execution of DVFS.

Although embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A Dynamic Voltage and Frequency Scaling (DVFS) method, comprising:
   scheduling execution of DVFS to adjust frequency or voltage of a target device at a first scheduled time;
   monitoring operating frequency of the target device; and
   deferring execution of DVFS at a second scheduled time, which occurs after the first scheduled time, when the operating frequency of the target device is below a minimum frequency and a central processing unit (CPU) is in an idle state.

2. The method of claim 1, further comprising executing DVFS at a third scheduled time, which occurs after the first scheduled time, when the operating frequency of the target device is greater than the minimum frequency and the CPU is in a run state.

3. The method of claim 1, further comprising executing DVFS at a third scheduled time, which occurs after the first scheduled time, when the operating frequency of the target device is greater than the minimum frequency and the CPU is in the idle state.

4. The method of claim 1, wherein the CPU is forced from the idle state to a run state in response to an interrupt to execute DVFS at a third scheduled time, which occurs after the first scheduled time, when the operating frequency of the target device is above the minimum frequency.

5. The method of claim 1, wherein the target device is a memory interface.

6. The method of claim 1, wherein the operating frequency or a supplied voltage of the target device is reduced upon execution of DVFS.

7. A system on chip (SOC), comprising:
   a central processing unit (CPU), a memory, and a target device controlled by the CPU, the memory having stored instructions executable by the CPU to:
   schedule dynamic voltage and frequency sealing (DVFS) to adjust frequency or voltage of the target device at a first scheduled time;
   receive operating frequency of the target device; and
   defer execution of DVFS at a second scheduled time, which occurs after the first scheduled time, when the operating frequency of the target device is below a minimum frequency and the CPU is in an idle state.

8. The SOC of claim 7, wherein the CPU is forced from the idle state to a run state to execute DVFS in response to an interrupt when the operating frequency of the target device is above the minimum frequency.

9. The SOC of claim 7, wherein the CPU is not forced from the idle state to the run state in response to an interrupt to execute DVFS at a third scheduled time, which occurs after the first scheduled time, when the operating frequency of the target device is below the minimum frequency.

10. The SOC of claim 7, wherein the target device is a memory interface.

11. The SOC of claim 7, wherein the target device is a non-CPU intellectual property (IP).

12. The Soc of claim 11, wherein the second target device is an input/output (I/O) interface.

13. The SOC of claim 7, further including a second target device controlled by the CPU, wherein the memory includes further stored instructions executable by the CPU to perform DVFS to adjust frequency or voltage of the second target device.

14. The Soc of claim 7, wherein the operating frequency or a supplied voltage of the target device is reduced upon execution of DVFS.

15. The Soc of claim 7, wherein the Soc is embodied in of a smartphone, a camera, a wearable smart device, or an internet of things (IoT).

16. A wearable electronic device, comprising:
   a system on Chip (SOC), comprising:
   a central processing unit (CPU), a memory, and a memory interface controlled by the CPU, the memory having stored instructions executable by the CPU to:
   schedule dynamic voltage and frequency scaling (DVFS) to adjust frequency or voltage of a target device at a first scheduled time;
   receive operating frequency of the target device; and
   defer execution of DVFS at a second scheduled time, which occurs after the first scheduled time, when the operating frequency of the target device is below a minimum frequency and the CPU is in an idle state;
   a memory device connected to the memory interface; and
   a display.

17. The wearable electronic device of claim 16, wherein the CPU is forced from the idle state to the run state to execute DVFS in response to an interrupt when the operating frequency of the target device is above the minimum frequency.

18. The wearable electronic device of claim 16, wherein the CPU is not forced from the idle state to the run state in response to an interrupt to execute DVFS at a third scheduled time, which occurs after the first scheduled time, when the operating frequency of the target device is below the minimum frequency.

19. The wearable electronic device of claim 16, wherein the target device is a memory interface.

20. The wearable electronic device of claim 16, wherein the target device is a non-CPU intellectual property (IP).

\* \* \* \* \*